UNITED STATES PATENT OFFICE.

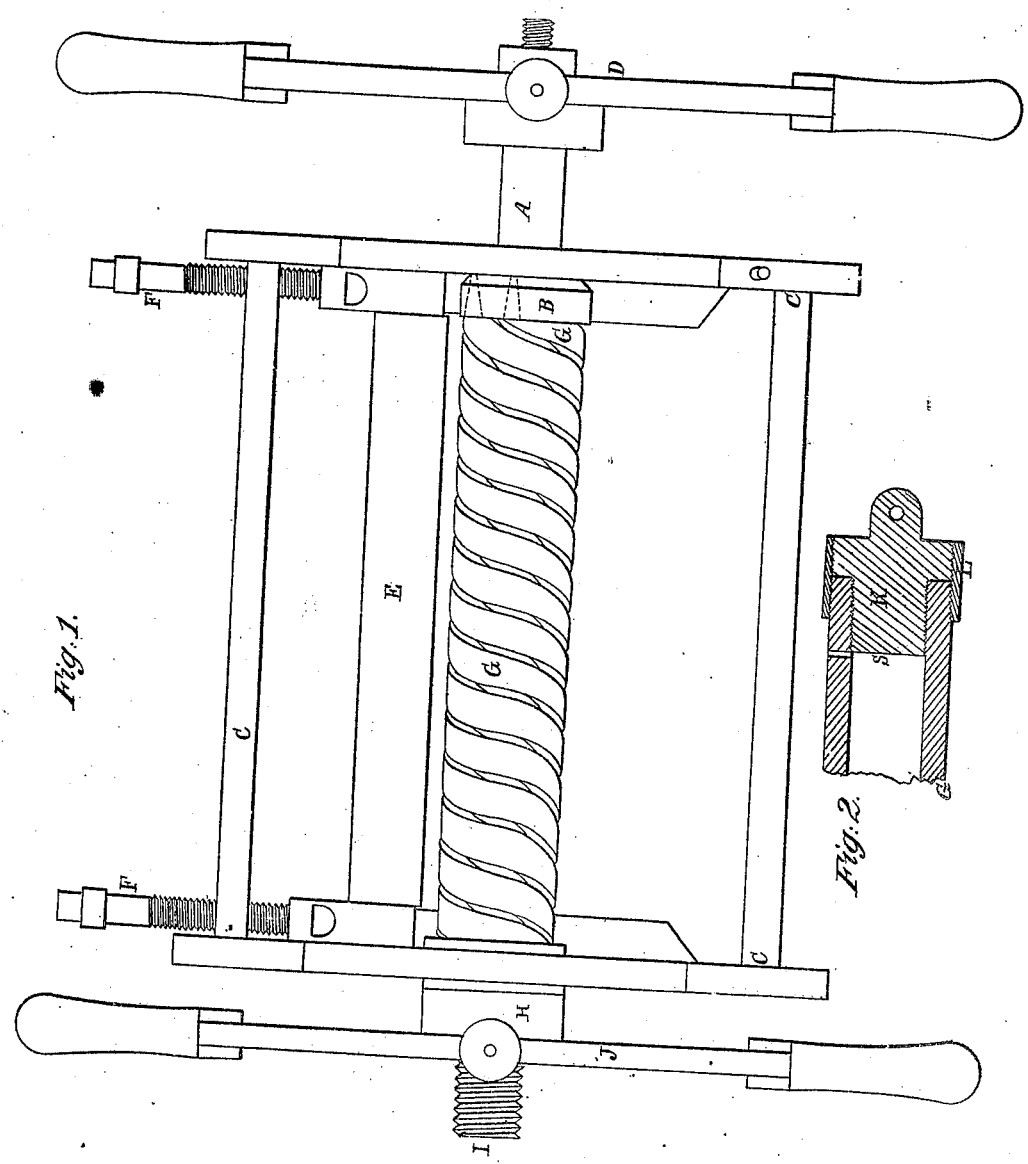

RANSOM COOK, OF SARATOGA SPRINGS, NEW YORK.

MANUFACTURE OF WROUGHT-IRON AND STEEL CANNONS.

Specification of Letters Patent No. 2,443, dated February 1, 1842.

*To all whom it may concern:*

Be it known that I, RANSOM COOK, of Saratoga Springs, in the county of Saratoga and State of New York, have invented a new and useful Improvement in the Manufacture of Cannon, which is described as follows, reference being had to the annexed drawings of the same, making part of this specification.

Figure 1 is a plan of the machine for bending the bars. Fig. 2 is a section showing the manner of securing the breech pin.

In preparing a bar of iron for the purpose of forming a gun therefrom several bars or plates of iron should be welded together in such a manner that the fibers or grain of the iron may cross each other in the different bars or plates at various angles in such manner as may be found most conductive to strength, plates or bars of steel are then welded on the side of the bar which is intended to form the inner surface of the cannon when the bars are bent.

*Mode of forming the cannon.*—Let a round iron or steel rod or arbor A be prepared of nearly the size required for the bore of cannon to be manufactured, having near one end of said rod or arbor a collar B firmly secured thereto—said rod or arbor is to be placed in a frame C or other suitable place of security in such a manner that it may be revolved or turned when in use. At one end of said rod a lever pilot wheel D cog wheel or other contrivance should be attached to turn the same. Parallel and near said rod or arbor a roller E is to be placed its distance from the rod or arbor to be graduated by screws F or other means to correspond with the thickness of the bars to be wound.

One end of a wrought iron bar C, prepared in the manner above described being hooked into or otherwise attached to the collar B of the rod or arbor A before mentioned and the rod or arbor A then turned the bar of iron or steel to be wound will press against the roller E and be wound spirally around the said rod or arbor the edges of the bar to be brought in contact or nearly so with each other. The roller E before mentioned bending the bar of iron and smoothly rolling it around the rod or arbor and thus forming it into a cylinder or tube of the size and shape of the cannon required. The tube thus formed is to be slipped from the rod or arbor A, and brought to a welding heat in a suitable furnace prepared for the purpose. It is then to be slipped upon the rod or arbor A one end of it being in contact with the fixed collar B on the rod or arbor while a pressure by means of screw or other power is given to the opposite end of the tube by a screw on the rod and a nut turning thereon or by other suitable means thus bringing the edges of the bar composing the tube in contact while in a welding state. After the tube is thus pressed endwise the arbor and tube may be slowly turned while several persons hammer the outer surface of the tube—or while thus turned rollers may be brought to press in opposite directions upon the outer surface thus smoothing the tube and compressing the iron. The tube being thus welded a second bar may be wound over it in such a manner that the latter shall cover the joints where the first bar was welded or if found better in practice the second bar may be wound in an opposite direction from the first so as to cross the joints formed by the first course. The whole may then be welded together in the manner before described. After the gun has been thus formed and bored the gun is to hardened, after which operation the gun will have a hard internal surface.

The breech pin K is to be turned with a shoulder of the diameter of the gun at its largest end. After the breech pin is screwed into the bore of the gun it is to be put into a lathe and a screw chased upon the edge or periphery of the shoulder of the breech pin and continuing a short distance upon the gun barrel. A band L of wrought iron having a female screw chased within it is then to be screwed over the breech pin and upon the gun barrel thus securing the breech pin to the gun barrel both internally and externally. In manufacturing Paixham guns on this principle the chamber for the cartridge will be bored in the breech pin. The cannon may be also constructed of separate rings, bands, or hoops of steel or iron or composed of both steel and iron welded together on the arbor by compression as before described.

This mode of welding bars and plates of iron may be applied to making shafts for steam boats and for other purposes.

What I claim as my invention and which I desire to secure by Letters Patent is—

1. The combination of the rod or arbor A, collar B, and roller E for bending the bars composing the cannon as described.

2. The combination of the nut H and screw I with the sliding frame for compressing the coils hoops rings or bands together against the collar B in the operation of welding as described.

3. The mode of preparing the bars of which the cannon is to be composed by welding plates together with the fibers or grain crossing as herein described—and also welding plates of steel on the surface of the bars which will compose the inner surface of the cannon for the purpose and in the manner described.

RANSOM COOK.

Witnesses:
W<small>M</small>. P. E<small>LLIOT</small>,
E<small>DW</small>. M<small>AHER</small>.